United States Patent Office 2,860,545
Patented Nov. 18, 1958

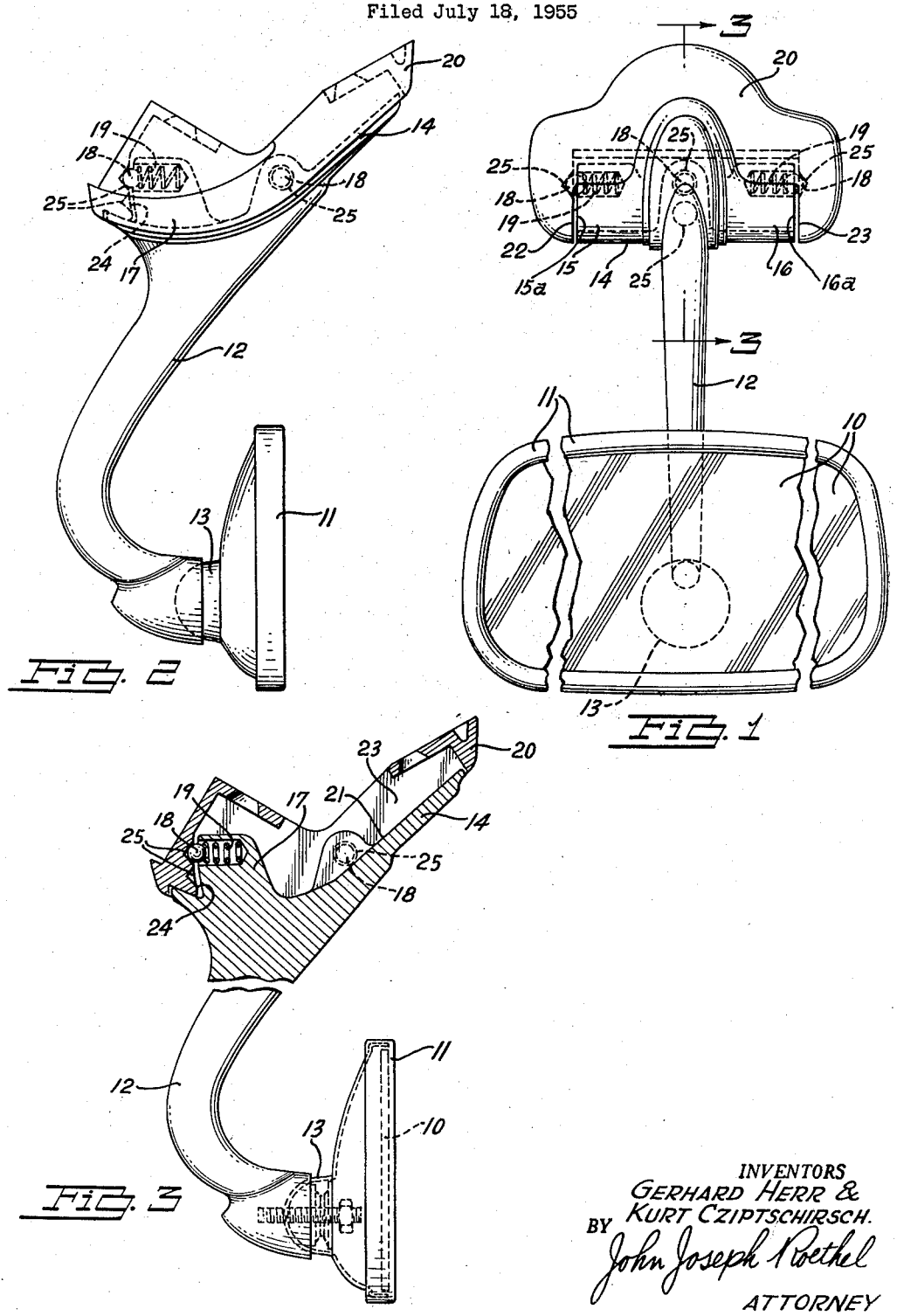

2,860,545

REAR VIEW MIRROR MOUNTING STRUCTURE

Gerhard Herr, Wuppertal-Vohwinkel, and Kurt Cziptschirsch, Wuppertal-Elberfeld, Germany, assignors to Gebruder Happich-Gesellschaft mit beschrankter Haftung, Wuppertal-Elberfeld, Germany Application July 18, 1955, Serial No. 522,720

Claims priority, application Germany July 19, 1954

4 Claims. (Cl. 88—98)

This invention relates to rear view mirrors and particularly to the type mounted interiorly of automobiles or the like.

The conventional interiorly mounted vehicle rear view mirror device comprises a supporting plate which is securely fastened to the automobile body, usually in the vicinity of the front windshield frame. The supporting plate has attached thereto an arm bearing the mirror, the arm being tiltably mounted or attached to the supporting plate by an articulated joint, such as a ball and socket joint or a universal joint. Removal of the supporting arm from the supporting plate can only be accomplished with a tool adapted to remove the retaining fasteners.

Oftentimes, when the vehicle is suddenly braked or is involved in an accident, a passenger will strike his head on the protruding mirror device. This is because the mirror device is placed at eye level and therefore in line with or at head height.

It is an object of the present invention to provide a construction and arrangement whereby the mirror arm is not secured to the support platform in such a manner that it can only be removed by a tool. More particularly, it is an object of the present invention to so mount the mirror support arm on the supporting platform that a shock impact will cause the mirror to move out of the path of the striking object. That is, the mirror arm is attached to the supporting plate by a yieldable catch device. If, therefore, some object, such as a person's head, unyieldably strikes the mirror, the mirror support arm will jump out of the retaining catch means and will thus fall away from the supporting plate. The resistance of the mirror supporting arm catch device to disengagement of the arm from the plate is relatively slight ensuring that the mirror or the supporting arm will not be the cause of serious injury to the part of the person striking the same.

In its illustrated embodiment the present invention comprises a supporting plate having smooth and nonprotruding edges and the mirror arm is provided with a tongue means retainable within a groove means in the supporting plate by a spring means. As illustrated, a convenient and easily affected catch device is obtained by coacting catch means located at three positions. The tongue element or portion of the mirror arm is T-shaped and the receiving groove or socket in the support plate is complementarily shaped. The catch means provided comprises spring urged stop balls operatively embedded in the T-shaped tongue element at the ends of the legs and the stem of the T. The balls are adapted to engage complementary recesses in the side walls of the supporting plate grooves or socket.

By the simple provision of a pair of vertically spaced aligned recesses selectively engageable by the ball carried in the stem of the T-shaped portion of the supporting arm, the mirror support arm may be retained in a first tilted position or a second tilted position, movability of the mirror from one position to the other permitting the mirror to be bodily raised or lowered as desired.

Other features, objects and advantages of the present invention will be apparent from the following description and appended claims, reference being had to the accompanying drawing forming a part of this specification wherein like reference numerals designate corresponding parts in the several views:

Fig. 1 is a front view part fragmentary.

Fig. 2 is a side view.

Fig. 3 is a view in part sectional, the sectional portion being taken substantially through line 3—3 of Fig. 1 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

The embodiment of the invention illustrated in the drawing comprises a mirror 10 contained within a mirror housing 11. The mirror housing 11 is operatively mounted on the end of a support arm 12, as by means of a conventional ball and socket joint 13. As illustrated the ball and socket connection is at the lower end of the support arm 12.

At its upper end the support arm 12 is provided with a substantially T-shaped appendage 14 having the leg portions 15 and 16 and a stem portion 17. Each leg portion, 15 and 16, has in its end face, 15a and 16a, respectively, a ball 18, the ball being retained therein in any convenient manner and also being yieldingly maintained so as to project slightly beyond the end face, 15a or 16a, by a spring 19. A similar ball 18 and corresponding spring 19 is provided in the stem 17.

A supporting plate 20 adapted to be secured to the interior of a vehicle body in any convenient manner is provided. The supporting plate 20 has a substantially T-shaped well or recess 21 therein adapted to receive the T-shaped appendage 14 of the support arm 12, the T-shaped appendage fitting within the well 21 rather loosely. Conical recesses 25 are provided in the sidewalls 22, 23 and 24 of the well or recess 21, the conical recesses 25 being adapted to receive the balls 18.

It will be noted that the recesses in the respective walls 22 and 23 are in alignment thereby providing an axis about which the mirror support arm 12 may be tilted. The well or recess wall 24 is provided with two conical recesses 25, one above the other. The ball 18 adjacent said recess wall 24 may be selectively snapped into either of the recesses 25 thereby to selectively regulate the angle of tilt of the support arm 12.

The pressure of the spring 19 holding the balls 18 in the respective recesses 25 is such that the mirror support arm 12 is maintained in position with stability despite the normal vehicular vibrations encountered. However, if the mirror device, that is, the housing 11 and support arm 12 are struck, as by a portion of a person's body or head, the T-shaped appendage 14 of the support arm 12 will be snapped out of the well or recess 21 retaining it, and the mirror housing 11 and support arm 12 will fall away. Thus, in the event the vehicle is suddenly stopped, as a result of the emergency application of the brakes or a collision, and the passenger sitting in line with the mirror device is thrown forward so as to strike the same, the present invention provides a simple effective means of diminishing or preventing the chances of serious injury to such passenger.

We claim:
1. A vehicle rear view mirror device comprising mirror means, a support arm, mounting means mounting said mirror means on one end of said support arm, a mounting plate adapted to be secured to a vehicle interior, said support arm having a substantially T-shaped appendage on the opposite end thereof, said appendage having leg portions and a stem portion, substantially T-shaped recess means on said support plate receiving said appendage, and pressure means normally maintaining said appendage within said recess means, said pressure means comprising a ball projecting from the end face of each leg portion and stem portion, spring means yieldably urging said balls outwardly, and conical recess means carried in the side walls of said mounting plate recess means receiving said balls, said spring means being yieldable to permit separation of said mounting plate and support arm upon the latter being subject to an impact, said balls projecting from the leg portion end faces being in alignment to provide an axis about which the support arm is tiltable, said stem portion ball being selectively receivable in at least two conical recesses to maintain said support arm in one of at least two selective positions.

2. A vehicle rear view mirror device comprising mirror means, a support arm, means attaching said mirror means to one end of said support arm, a mounting member adapted to be secured to an interior surface of a vehicle compartment, said mirror means being mounted with the mirror plane thereof normally extending generally laterally of said compartment, and connecting means releasably holding the other end of said arm member in engagement with said mounting member, said connecting means comprising spaced catch elements movably mounted in one of said members for movement in a direction substantially parallel to the mirror plane, and resilient means urging said catch elements into engagement with catch element receiving portions of the other of said members, said resilient means normally causing said catch elements to maintain said arm member in mounted relationship to said mounting member but yielding to permit movement of the catch elements out of engagement with said catch element receiving portions upon a predetermined force being exerted upon said one end of the support arm in a direction normal to said mirror plane.

3. A vehicle rear view mirror device comprising mirror means, a support arm, means attaching said mirror means to one end of said support arm, a mounting member adapted to be secured to an interior surface of a vehicle compartment, said mirror means being mounted with the mirror plane thereof normally extending generally laterally of said compartment, and connecting means releasably holding the other end of said arm member in engagement with said mounting member, said arm member when in engagement with said plate member extending in a direction generally vertically thereto, said connecting means comprising catch elements mounted in one of said members for movement along a horizontal axis, and resilient means urging said catch elements into engagement with catch element receiving portions of the other of said members, said resilient means normally causing said catch elements to maintain said arm member in mounted relationship to said mounting member but yielding to permit movement of the catch elements out of engagement with said catch element receiving portions upon a predetermined force being exerted upon said one end of the support arm in a direction normal to said mirror plane.

4. A vehicle rear view mirror device comprising mirror means, a support arm, means attaching said mirror means to one end of said support arm, a mounting member adapted to be secured to an interior surface of a vehicle compartment, said mirror means being mounted with the mirror plane thereof normally extending generally laterally of said compartment, and connecting means releasably holding the other end of said arm member in engagement with said mounting member, said arm member when in engagement with said plate member extending in a direction generally vertically thereto, said connecting means comprising catch elements mounted in one of said members for movement along a horizontal axis, and resilient means urging said catch elements into engagement with catch element receiving portions of the other of said members, said resilient means normally causing said catch elements to maintain said arm member in mounted relationship to said mounting member but yielding to permit movement of the catch elements out of engagement with said catch element receiving portions upon a predetermined force being exerted upon said one end of the support arm in a direction normal to said mirror plane, said catch elements being constructed and arranged to provide a pivot axis about which said arm is tiltable, and means effective to selectively position and maintain said arm in at least two positions of tilt.

References Cited in the file of this patent
UNITED STATES PATENTS

| | | |
|---|---|---|
| 1,221,279 | Brisley | Apr. 3, 1917 |
| 1,700,524 | Whitehead et al. | June 29, 1929 |
| 2,535,270 | Davis | Dec. 26, 1950 |